United States Patent [19]
Patrick

[11] Patent Number: 4,461,225
[45] Date of Patent: Jul. 24, 1984

[54] MULTIPLE SEED PLANTER WITH SEED DISCHARGE MECHANISM

[76] Inventor: James H. Patrick, Thunderbird Meadows, Kirkland, Ariz. 86332

[21] Appl. No.: 445,912

[22] Filed: Dec. 1, 1982

[51] Int. Cl.³ .............................................. A01C 5/02
[52] U.S. Cl. ...................................... 111/95; 221/82
[58] Field of Search ................................. 111/90–92, 111/95, 96; 221/82, 83; 220/335, 326, 317, 318

[56] References Cited
U.S. PATENT DOCUMENTS

| | | | |
|---|---|---|---|
| 257,820 | 5/1882 | Horton | 111/95 |
| 1,182,826 | 5/1916 | Wilbanks | 111/95 |
| 1,253,621 | 1/1918 | Martinson | 111/95 |
| 2,865,314 | 12/1958 | Landin | 111/95 |

FOREIGN PATENT DOCUMENTS 57503  3/1921  Sweden ................................ 111/95

Primary Examiner—Robert A. Hafer
Assistant Examiner—Danton DeMille
Attorney, Agent, or Firm—Allen D. Gutchess, Jr.

[57] ABSTRACT

A seed planter is provided for depositing seeds in the ground. The planter includes an elongate body having a handle at one end and a discharge passage at the other end. A hood opens and closes a discharge opening at the end of the passage and is connected to an actuating lever near the handle by linkages. A magazine is located between the handle and the discharge passage for holding seeds and supplying seeds to the passage as the actuating lever is manipulated. The magazine has a spring-loaded cover for closing off seed receptacles of the magazine and a cover latch is mounted on the handles for holding the cover open during loading of the receptacles.

14 Claims, 6 Drawing Figures

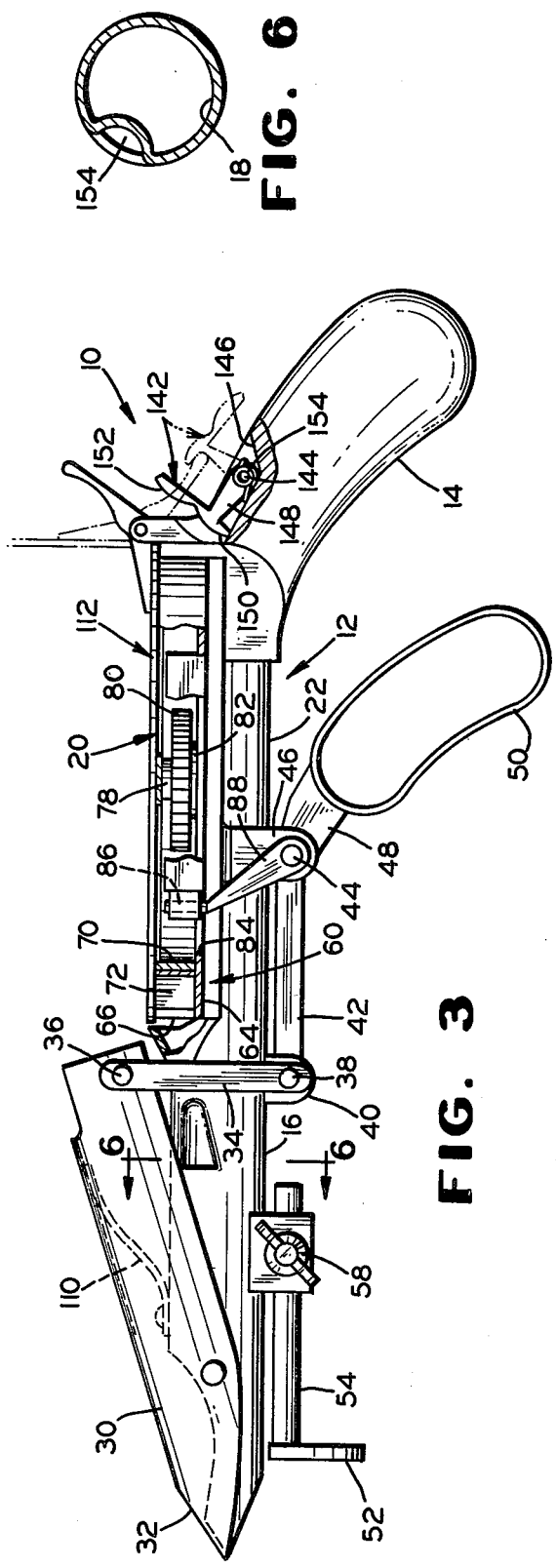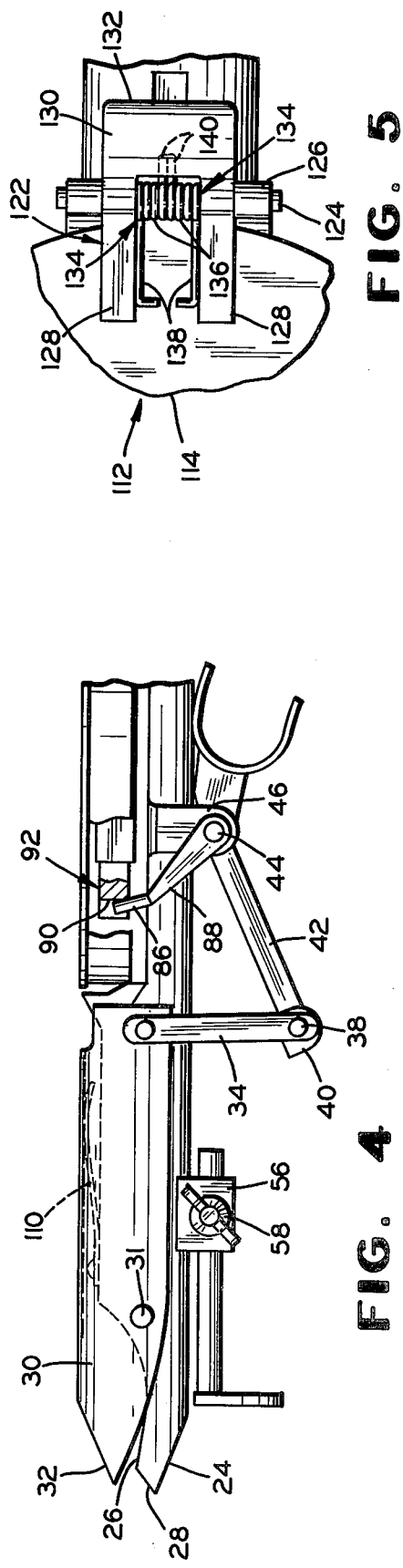

MULTIPLE SEED PLANTER WITH SEED DISCHARGE MECHANISM

A hand-operated seed planter is provided for planting seeds at selected locations in the ground.

Seed planters of various designs have been known in the art as evidenced by the following U.S. Pat. Nos. 267,775 to Chipman; 431,841 to Davis; 1,253,621 to Martinson; 1,830,283 to Madderra; 2,361,005 to Baer; and, 2,865,314 to Landin et al.

The present invention provides a seed planter having a unique hand-operated lever and linkages for opening and closing a discharge passage of the planter and for rotating a magazine to supply seeds to the passage. The magazine holds the seeds in a plurality of peripheral receptacles and has a spring-loaded cover over the receptacles which is resiliently held in a closed position. When the magazine cover is moved to an open position, a spring-loaded latch mounted on the handle of the planter holds the cover open.

It is, therefore, a principal object of the invention to provide an improved multiple seed planter for planting seeds in desired locations in the ground.

Another object of the invention is to provide a seed planter having a seed magazine with a spring-loaded cover and a spring-loaded latch for holding the cover open.

Yet another object of the invention is to provide a multiple seed planter with a hand operated lever and improved linkages for opening and closing a discharge passage of the planter and for rotating a magazine holding the seeds.

Many other objects and advantages of the invention will be apparent from the following detailed description of a preferred embodiment thereof, reference being made to the accompanying drawings, in which:

FIG. 3 is a side view in elevation, with parts broken away and with parts in section, of the seed planter of FIGS. 1 and 2 with the cover closed;

FIG. 4 is a fragmentary side view in elevation of the seed planter with an operating lever and linkages in a different position;

FIG. 5 is a fragmentary, detailed view of a portion of the cover mechanism of FIGS. 2 and 3; and FIG. 6 is a view in transverse cross section taken along the line 6—6 of FIG. 3.

Figure 1:
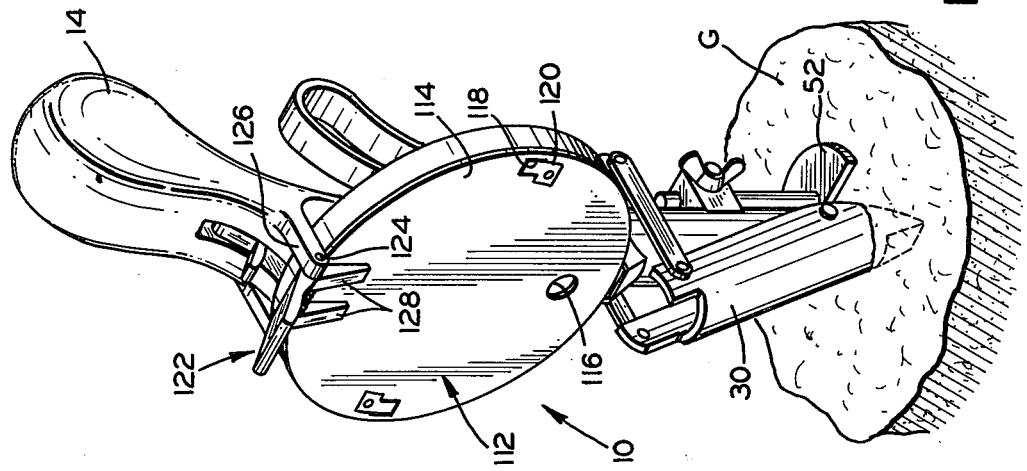
FIG. 1 is a view in perspective of a seed planter in accordance with the invention in an operating position with respect to the ground.

A multiple seed planter in accordance with the invention is indicated at 10 and is shown in an operating position with respect to ground G in FIG. 1, being inserted to a desired depth from the ground and ready to discharge a seed into a recess made by the nose of the planter. Referring particularly to FIG. 3, the planter 10 includes an elongate body 12 having a handle 14 at one end generally of a pistol grip design. The opposite end of the body has a tube 16 forming a discharge passage 18 (FIG. 6) for the discharge of seeds from a multiple seed magazine 20 located at an intermediate portion 22 of the body 12, between the handle 14 and the discharge tube 16.

The tube 16 is formed inwardly at 24 at its discharge end and is cut away at 26 to leave a discharge orifice 28. The orifice 28 is opened and closed by a control member or hood 30 pivotally mounted on the tubular member 16 by suitable pins or rivets 31. The discharge end of the hood 30 is formed inwardly at 32 to close the discharge orifice 28 when the hood moves from an open position of FIG. 4 in a counterclockwise direction to the closed position of FIG. 3. The inwardly formed portions 24 and 32 of the tube 16 and the hood 30 form a tapered nose for the planter to facilitate penetration into the ground G.

Movement of the hood 30 between its opened and closed positions is achieved through rear links 34 pivotally mounted on a rear portion of the hood 30 by suitable pins or rivets 36. The links 34 extend downwardly below the body 12 where they are pivotally mounted by pins or rivets 38 to a transverse yoke 40 extending across the body therebelow. An intermediate portion of the yoke 40 is affixed to a rearwardly-extending lever rod 42 which is pivotally supported at the rear end by a shaft 44 supported by two ears 46 extending downwardly from the planter. A structurally-integral lever arm 48 extends rearwardly from the lever rod 42 and, in turn, is structurally-integral with an actuating lever grip 50. This provides a comfortable finger grip for the hand of an operator. When the grip 50 is squeezed and pulled rearwardly in adjacent relationship with the planter handle 14, the lever arm 48 is raised and the lever rod 42 is lowered in a counterclockwise direction, lowering the yoke 40 and the links 34 to move the hood 30 in a clockwise direction to the open position of FIG. 4 wherein a seed in the discharge passage 18 can be discharged through the discharge orifice 28. When the grip 50 is squeezed, the seed is readily discharged into the bottom of the recess formed by the nose of the planter. The degree of penetration of the planter nose can be adjustably determined by a stop plate 52 adjacent the nose and mounted on a supporting rod 54. The rod extends through a supporting bracket 56 mounted on the tube 16 and tightened and loosened by a suitable wing nut 58 or the like.

Figure 2:
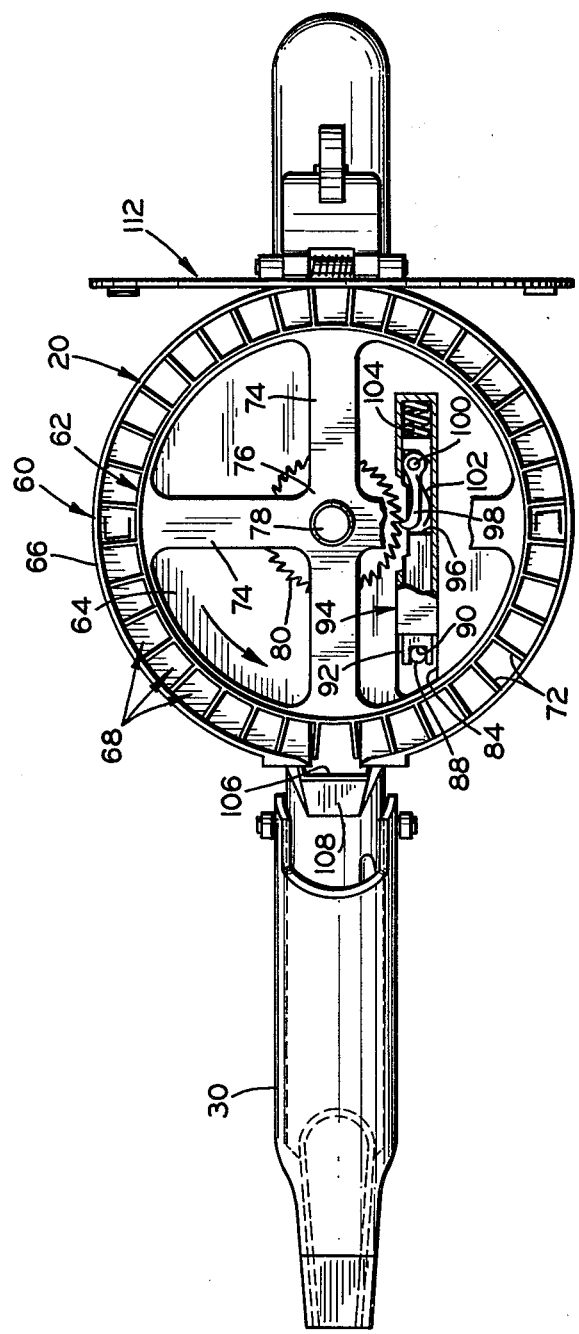
FIG. 2 is a plan view of the seed planter of FIG. 1 with a magazine cover in an open, loading position and held in that position by a latch.

The seed magazine 20 basically includes a receptacle race 60 and a receptacle carriage 62. The race 60 includes a circular bottom wall 64 and a cylindrical outer wall 66, the bottom wall 64 being suitably affixed to the intermediate portion 22 of the planter body 12. The walls 64 and 66 thus form the bottom and the outer wall of a plurality of peripheral receptacles 68. The receptacle carriage 62 has an inner peripheral wall 70 and a plurality of radially-extending walls or partitions 72 forming the rear and side walls of the receptacles 68, the tops thereof being open. The inner wall 70 is connected by suitable spokes 74 (FIG. 2) to a central hub 76 of the carriage. The hub 76 is rotatably mounted on a suitable axis or post 78 extending upwardly from the center of the receptacle race 60. The hub 76 is suitably affixed to a ratchet gear 80 located therebelow and supported on a suitable washer 82 (FIG. 3) positioned around the post 78 on the circular bottom wall 64 of the receptacle.

The bottom wall 64 of the race 60 also has an elongate slot 84 (FIGS. 2-4) extending longitudinally of the body 12 and located to one side of the ratchet gear 80. A pawl 86 extends upwardly through the slot 84 and is structurally integral with an actuating arm 88 which is affixed to one end of the shaft 44 beyond one of the ears 46. The pawl 86 and the actuating arm 88 thus rotate in a counterclockwise direction from the position of FIG. 3 to the position of FIG. 4 when the grip 50 is squeezed.

The pawl 86 engages an end notch 90 of a pawl carrier 92 (FIG. 2) which is slidably located in a guide 94 mounted on the bottom wall 64 of the race 60 to the rear of the slot 84 therein. The carrier has a rear recess 96 in which a ratchet pawl 98 is located, being pivotally supported on a pin 100 and urged outwardly from the recess toward the ratchet gear 80 by a leaf spring 102. The pawl 98 engages teeth of the ratchet gear 80 when the pawl is moved rearwardly to rotate the seed receptacles 68 in a counterclockwise direction. In the opposite direction, the pawl rides over the teeth without moving the receptacles 68. The carrier 92 is moved rearwardly by the pawl 98 and is urged forwardly by a coil spring 104 located in the rear of the carrier guide 94.

When the receptacle carriage 62 is moved counterclockwise, a new one of the receptacles 68 is aligned with a charge opening 106 located at the charge end of the discharge passage 18 and formed by a slanted wall 108 struck upwardly from the tubular member 16 at the supply end thereof. With the planter pointed downwardly as in FIG. 1, the seed in the aligned receptacle 68 is discharged from the receptacle and supplied through the passage 18 to the discharge orifice 28 where it remains until the hood 30 is moved from the closed position of FIG. 3 to the open position of FIG. 4.

Each time the handle 50 is squeezed from the position of FIG. 3 to a position adjacent the handle (FIG. 4) the hood 30 is moved to the open position to discharge a seed through the orifice 28. At this time, the pawl 86 is moved from the position of FIG. 3 to the position of FIG. 4 to move the pawl carriage 92 from the rear to the forward position with the pawl 98 sliding over the teeth of the ratchet gear 80, at which time the receptacles 68 remain stationary. When the grip 50 is released, it does so under the action of a heavy leaf spring 110 which is mounted on the tubular member 16 of the planter body and urges the hood 30 toward the closed position of FIG. 3. At this time, the pawl 86 and the carrier 92 are moved rearwardly, overcoming the force of the coil spring 104 and causing the pawl 98 to move the receptacle 68 one receptacle width in the counterclockwise direction, thereby aligning the next receptacle with the supply opening 106 of the discharge passage 18. The seed in the next receptacle then falls down to the discharge end of the passage 18 where it can be discharged through the discharge orifice 28 the next time the grip 50 is squeezed and the hood 30 is opened.

A cover 112 in accordance with the invention is located over the magazine 20. It includes a cover plate 114 of circular configuration having a diameter substantially equal to that of the receptacle race 60 so as to form removable top walls for the receptacles 68. The cover plate 114 has an access opening 116 (FIG. 1) through which numbers on the spokes 74 can be viewed to determine the extent of the seeds remaining in the receptacle 68. The cover plate 114 also has rectangular, diametrically-opposite openings 118 therein, downwardly through which leaf springs 120 extend. The lower edges of the leaf springs 120 project below the bottom surface of the cover 114 and contact the side walls 72 of the receptacle 68. These enable the side walls to move past the springs in a counterclockwise direction but abut the upper edge portions of the side walls to prevent movement of the receptacles in the opposite direction. Thus, the receptacle 68 cannot move counterclockwise due to the drag of the pawl 98 on the gear 80 when the pawl carrier 92 moves forwardly in the guide 94.

The cover plate 114 of the cover 112 is pivotally supported on the planter body 12 by a cover lever 122 affixed to a peripheral edge portion of the plate and through which a pin or axle 124 extends. The pin 124 has ends supported in ears 126 extending upwardly from a forward portion of the planter handle 14 above the cover plate 114 to the rear thereof. Specifically, the cover lever 122 has two arms 128 affixed to the cover plate 114 and extending upwardly and rearwardly to a thumb plate 130 having a rearwardly rounded edge 132. Return springs 134 have intermediate coil portions 136 wrapped around the pin 124 with end portions 138 bearing against the upper surface of the cover plate 114 and other end portions 140 bearing against a portion of the handle 14 between the ears 126. The springs 134 are designed to constantly urge the cover plate 114 toward the closed position over the receptacles 68. The cover plate is opened when sufficient pressure is placed on the thumb plate 130 of the cover lever 122 to overcome the force of the springs 134.

A cover lever latch 142 (FIG. 3) is pivotally mounted by a pin 144 in a notch 146 located in an upper forward portion of the handle 14. As shown, the latch 142 is generally T-shaped, having a stem 148 through which the pin 144 extends and having a catch leg 150 and a thumb-operated leg 152. A coiled spring 154 is located around the pin 144 and engages the stem 148 of the latch and the bottom of the notch 146 in a manner to urge the latch 142 in a counterclockwise, out-of-the-way position.

When it is desired to open the cover 112 fully to the vertical position shown in dotted lines in FIG. 3, the latch 142 can first be moved clockwise beyond the dotted line position so that the catch leg 150 thereof engages the rear edge 132 of the thumb plate 130 of the cover lever 122 when the cover plate 114 is fully raised and the latch 142 is released from its fully retracted position. The cover 112 will then remain in its open position as when the empty receptacles 68 are loaded once again with seeds. The cover 112 can then be moved to its closed position by releasing the latch 142. This is accomplished by pressing down on the thumb leg 152 to move the catch 150 away from the thumb plate 130, allowing the springs 134 to close the cover 112, that closing movement being retarded by pressure on the thumb plate 130 or against the cover plate 114, if desired.

The planter 10 can also be operated independently of the magazine 20. This can be accomplished with the hood 30 in the closed position of FIG. 3, at which time an access opening 154 (FIG. 6) in the tubular member is exposed. A single seed can then be dropped through this opening and the grip 50 squeezed when the planter is in position in the ground to open the hood 30 and discharge that seed in the recess formed in the ground by the nose of the planter. The proper depth at that time again can be achieved through the adjustable stop plate 52.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. A seed planter comprising a body having a discharge passage at one end and a handle at the other end, a magazine between said passage and said handle for supplying seeds to said discharge passage, a hood pivotally mounted on said body and having an open position opening a discharge end of said discharge passage and a closed position closing off the end of said discharge passage, means for moving said hood between said open and closed positions comprising a lever rod pivotally supported by said body and having linkages connecting said lever rod to said hood to move said hood when said lever rod is moved by a lever arm, said magazine having a receptacle carriage and a pawl moveable by said lever arm for rotating said receptacle carriage when said hood is moved from the open position to the closed position, a cover for said magazine, said cover comprising a cover plate, a cover lever affixed to said cover plate and pivotally connected to said body, said cover lever having means extending toward said handle for engagement by an operator to open said cover, a cover latch moveably supported by said handle and having a catch leg to engage said cover lever when said cover plate is open to hold said plate in an open position.

2. A seed planter according to claim 1 characterized by resilient means urging said cover plate toward a closed position over said magazine.

3. A seed planter according to claim 1 characterized by resilient means urging said cover latch toward said cover.

4. A seed planter according to claim 1 characterized by the discharge end of said discharge passage tapering inwardly, and the end of said hood closing off the end of said discharge passage also tapering inwardly, whereby said end of said discharge passage and said hood form a tapered nose for facilitating entry of said planter into the ground.

5. A seed planter comprising a body having a discharge passage at one end and a handle at the other end with a magazine therebetween for supplying seeds to said discharge passage, a hood pivotally mounted on said body and having an open position opening a discharge end of discharge passage and a closed position closing off the end of said discharge passage, means for moving said hood between said open and closed positions comprising a rear link pivotally connected to a portion of said hood spaced from the end of said discharge passage, a lever rod pivotally connected to said rear link with a portion of said lever rod spaced from said rear link being pivotally supported by said body, a lever arm having an actuated lever grip affixed to said lever rod for moving said lever rod to move said rear link and to close and open said hood, said magazine having a receptacle carriage, an actuating pawl moveable by said lever arm, for rotating said recepticle carriage when said hood is moved from the open position to the closed position, a ratchet gear rotatable with said receptacle carriage, a ratchet pawl engagable with said ratchet gear for rotating said receptacle carriage, and a pawl carrier, said ratchet pawl being pivotally mounted on said pawl carrier which is moved by said actuating pawl.

6. A seed planter according to claim 5 characterized by said receptacle carrier having a plurality of peripherally-located receptacles arranged in a circular pattern, and the movement of said receptacle carrier by said pawl is substantially equal to the width of one of said receptacles.

7. A seed planter according to claim 5 characterized by there being a pair of the rear links between which is a yoke, and said lever rod being pivotally connected to said rear links through said yoke.

8. A seed planter according to claim 5 characterized by said pawl being located to one side of said lever arm and connected to said lever arm by a shaft.

9. A seed planter according to claim 5 characterized by resilient means engagable with said pawl carrier and urging said pawl carrier toward said actuating pawl.

10. A seed planter according to claim 5 characterized by the discharge end of said discharge passage tapering inwardly, and the end of said hood closing off the end of said discharge passage also tapering inwardly, whereby said end of said discharge passage and said hood form a tapered nose for facilitating entry of said planter into the ground.

11. A seed planter comprising an elongate body having a discharge passage at one end and a handle at the other end, and a magazine therebetween for supplying seeds to said discharge passage, a cover for said magazine, said cover comprising a cover plate, a cover lever affixed to said cover plate and pivotally connected to said body, said lever having a thumb plate extending toward said handle, resilient means urging said cover plate toward a closed position over said magazine, a cover lever latch pivotally supported by said handle and having a catch leg engagable with said thumb plate when said cover plate is open to hold said cover in an open position.

12. A seed planter according to claim 11 characterized by resilient means urging said cover lever latch toward said cover.

13. A seed planter according to claim 12 characterized by said latch having a thumb-operated leg for moving said latch away from said thumb plate.

14. A seed planter according to claim 11 characterized by said magazine comprising a receptacle carriage rotatably supported by said body, and said cover plate having resilient means engagable with said receptacle carriage to enable rotatable movement of said carriage in one direction but not in the other direction.

* * * * *